Patented June 10, 1924.

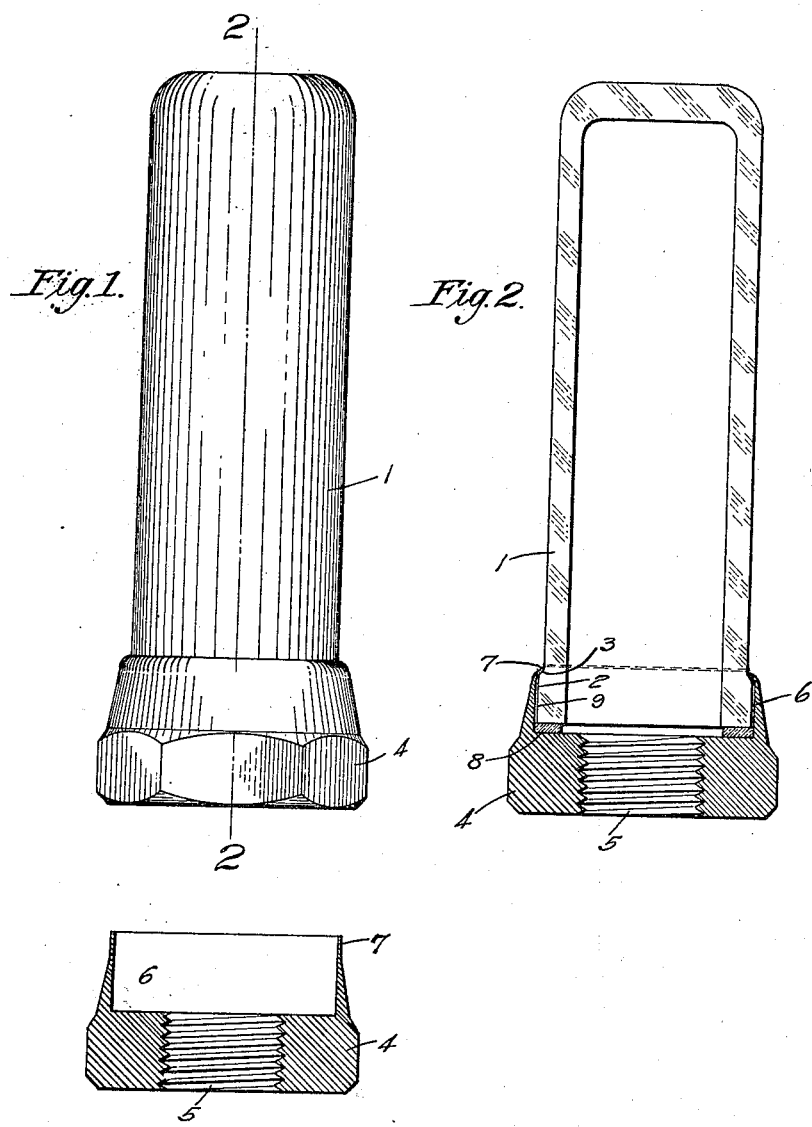

1,496,998

UNITED STATES PATENT OFFICE.

ISIDORE PULVERMAN, OF WARREN, PENNSYLVANIA.

TRANSPARENT CAP.

Application filed September 17, 1920. Serial No. 410,872.

*To all whom it may concern:*

Be it known that I, ISIDORE PULVERMAN, a citizen of the United States, residing at Warren, in the county of Warren and State of Pennsylvania, have invented new and useful Improvements in Transparent Caps, of which the following is a specification.

The cap is particularly designed to house the end of a valve stem for pneumatic tires where said valve stem is provided with an indicating gauge indicating the pressure of the tire. It will readily be understood that without such transparent cap so that the pressure or the tire may be readily observed without effort on the part of the user the desirability of the device is very much diminished.

To mount the cap on the stem a metal base is desirable and difficulty has been experienced in uniting such a base with a glass cap in such a way as not to break or crack the glass cap either at the time of assembling or subsequently where the cap is subjected to slight jars or extremes of temperature. The present invention is designed to afford an efficient means of securing a glass cap to the base.

The invention is illustrated in the accompanying drawing as follows:—

Fig. 1 shows an elevation of the cap.

Fig. 2 a section of the cap on the line 2—2 in Fig. 1.

Fig. 3 a section of the base as formed prior to its connection with the glass.

1 marks the glass cap which is in the form of a tube having one end closed and the other end open, the open end having a thickened bottom forming an outer enlargement 2 which forms a shoulder 3 on the outer surface near the bottom of the glass. A base 4 has preferably an angular periphery to form a tool receiving surface and a screw-threaded opening 5 which is adapted to screw on to the valve stem. It is provided with a socket 6, the upper edge of which has a lip 7 which is adapted to be crimped over the shoulder 3 so as to secure a glass cap or tube in the socket. As illustrated the said base is in the form of a polygonal nut and the socket is formed by means of an integral flange projecting axially from the top of the nut, and the outside diameter of the flange is less than the outside diameter of the nut, whereby when a wrench is applied to the nut the compression and strains to which the nut are subjected will be taken by the nut proper, and will not be transmitted to the glass tube through the flange, which latter will not be in contact with the wrench. In order to make the pressure on the glass a yielding one it is desirable to make this lip quite thin and also to provide a yielding or cushioning gasket 8 between the end of the tube or cap and the base of the socket. The outer surface of the enlargement 2 is preferably of slightly less diameter than the interior diameter of the socket 6 so that there is no tendency to crack the glass by uneven expansion of these walls. This leaves a small space 9 between the wall of the socket and the wall of the glass. With this structure there is little liability of the glass breaking. At the same time there is a secure connection between the base and glass. It will be noted that the lip is very thin as compared to the base from which it extends and also very thin as compared with the glass cap so that there is a rigid base of a thickness to form a mounting on the screw threads of a tire stem and of sufficient size to permit of the manipulation of the base on those screw threads and the lip is so thin as compared to the glass as to readily yield as the glass expands or contracts so as to prevent the breaking.

The metallic mounting for the tube is not specifically claimed herein, but is the subject matter of applicant's copending application filed May 29, 1920, Serial No. 385,316.

What I claim as new is:—

1. A device of the character described, having a transparent cap, comprising a glass tube closed at one end and having an enlargement at the opposite end to form a shoulder in proximity to said opposite end; and a metal base having an outer tool receiving surface and an opening therethrough adapted to receive a tire gauge stem for mounting the cap on said stem, a wall member graduating from the body portion of said base into an elongated, thin, yieldable lip member and forming a socket of greater diameter than the periphery of said tube to receive the open end thereof, the inner end of the tube receiving socket and the outer end of the gauge stem receiving opening terminating in the same plane, and a cushioning gasket located in the bottom of said socket against which the inner edge of said tube rests, said lip member spun snugly into engagement with said shoulder to form an air-tight joint thereby to center the tube so as to form an annular chamber between it and the wall member of said base.

2. A transparent cap for tire valves, comprising a glass tube of substantial thickness and being closed at one end and with its opposite open end of greater thickness whereby a shoulder will be formed near said open end, a metallic nut, an annular flange on the nut, said flange being concentric with the bore of the nut to form a cylindrical socket on one end of the nut, the interior diameter of the socket being greater than that of the bore of the nut and sufficient to receive the enlarged open end of the tube, said tube being supported on the top of the nut, the height of the flange being greater than that of the thicker portion of the tube, the outer diameter of the flange being less than the outside diameter of the nut, the free edge of the flange being thin relatively to the thickness of the major portion of the tube, the said edge of the flange being turned over on the shoulder to retain the tube in place.

In testimony whereof I have hereunto set my hand.

ISIDORE PULVERMAN.